United States Patent
Hart et al.

(10) Patent No.: US 7,505,163 B2
(45) Date of Patent: Mar. 17, 2009

(54) USER INTERFACE FOR NETWORKED PRINTER

(75) Inventors: Peter E. Hart, Menlo Park, CA (US); Jonathan J. Hull, San Carlos, CA (US); Jamey Graham, San Jose, CA (US); Kurt Piersol, Santa Cruz, CA (US)

(73) Assignee: Ricoh Co., Ltd., Tokyo (JP)

( * ) Notice: Subject to any disclaimer, the term of this patent is extended or adjusted under 35 U.S.C. 154(b) by 0 days.

(21) Appl. No.: 10/814,500

(22) Filed: Mar. 30, 2004

(65) Prior Publication Data

US 2005/0068568 A1    Mar. 31, 2005

Related U.S. Application Data

(60) Provisional application No. 60/506,411, filed on Sep. 25, 2003, provisional application No. 60/506,303, filed on Sep. 25, 2003, provisional application No. 60/506,302, filed on Sep. 25, 2003, provisional application No. 60/506,263, filed on Sep. 25, 2003, provisional application No. 60/506,206, filed on Sep. 25, 2003.

(51) Int. Cl.
*G06F 3/00* (2006.01)
*G06F 3/12* (2006.01)
*G06F 15/16* (2006.01)

(52) U.S. Cl. .................. 358/1.15; 709/205; 715/738

(58) Field of Classification Search ............. 358/1.15, 358/1.16, 1.9, 518; 382/117, 118, 162, 170; 345/505, 619; 709/205, 220, 226; 715/738
See application file for complete search history.

(56) References Cited

U.S. PATENT DOCUMENTS 4,133,007 A    1/1979    Wessler et al.
4,205,780 A    6/1980    Burns et al.

(Continued)

FOREIGN PATENT DOCUMENTS

CA    2386829    11/2002

(Continued)

OTHER PUBLICATIONS

"Load Balancing in a Heterogeneous Computing Environment", by Sridhar Gopal and Sriram Vajapeyam, Proceedings of the Thirty-First Hawaii International Conference on System Sciences, Jan. 6-9, 1998.*

(Continued)

*Primary Examiner*—James A Thompson
(74) *Attorney, Agent, or Firm*—Fenwick & West LLP

(57) ABSTRACT

A multifunction printer enables the printing of time-based media and is operated via a user interface. The user interface includes a touch screen for accepting command inputs and providing information to a user. Time-based media data is received by the printer from a media source specified via the user interface. A user specifies one or more multimedia processing functions for the printer to apply to the data. The printer performs the specified functions, and previews the output to the user via a display of the user interface. If the user decides to print the previewed output, the user specifies one or more output devices, such that the printer can print conventional printed output and/or to a specified electronic output.

118 Claims, 9 Drawing Sheets

U.S. PATENT DOCUMENTS

| | | | |
|---|---|---|---|
| 4,437,378 A | 3/1984 | Ishida et al. | |
| 4,619,522 A | 10/1986 | Imai | |
| 4,635,132 A | 1/1987 | Nakamura | |
| 4,734,898 A | 3/1988 | Morinaga | |
| 4,754,485 A | 6/1988 | Klatt | |
| 4,807,186 A | 2/1989 | Ohnishi et al. | |
| 4,831,610 A | 5/1989 | Hoda et al. | |
| 4,881,135 A | 11/1989 | Heilweil | |
| 4,907,973 A | 3/1990 | Hon | |
| 4,998,215 A | 3/1991 | Black et al. | |
| 5,059,126 A | 10/1991 | Kimball | |
| 5,091,948 A * | 2/1992 | Kametani | 704/248 |
| 5,093,730 A | 3/1992 | Ishii et al. | |
| 5,115,967 A * | 5/1992 | Wedekind | 236/46 R |
| 5,136,563 A | 8/1992 | Takemasa et al. | |
| 5,170,935 A | 12/1992 | Federspiel et al. | |
| 5,220,649 A | 6/1993 | Forcier | |
| 5,231,698 A | 7/1993 | Forcier | |
| 5,237,648 A | 8/1993 | Mills et al. | |
| 5,270,989 A | 12/1993 | Kimura | |
| 5,343,251 A | 8/1994 | Nafeh | |
| 5,386,510 A * | 1/1995 | Jacobs | 345/505 |
| 5,428,555 A * | 6/1995 | Starkey et al. | 700/275 |
| 5,432,532 A | 7/1995 | Mochimaru et al. | |
| 5,436,792 A | 7/1995 | Leman et al. | |
| 5,438,426 A | 8/1995 | Miake et al. | |
| 5,444,476 A | 8/1995 | Conway | |
| 5,479,600 A | 12/1995 | Wroblewski et al. | |
| 5,480,306 A | 1/1996 | Liu | |
| 5,485,554 A | 1/1996 | Lowitz et al. | |
| 5,493,409 A | 2/1996 | Maeda et al. | |
| 5,568,406 A * | 10/1996 | Gerber | 702/159 |
| 5,572,651 A | 11/1996 | Weber et al. | |
| 5,576,950 A | 11/1996 | Tonomura et al. | |
| 5,581,366 A | 12/1996 | Merchant et al. | |
| 5,590,257 A | 12/1996 | Forcier | |
| 5,596,698 A | 1/1997 | Morgan | |
| 5,617,138 A | 4/1997 | Ito et al. | |
| 5,624,265 A | 4/1997 | Redford et al. | |
| 5,627,936 A | 5/1997 | Prasad et al. | |
| 5,628,684 A | 5/1997 | Bouedec | |
| 5,633,723 A * | 5/1997 | Sugiyama et al. | 358/296 |
| 5,640,193 A | 6/1997 | Wellner | |
| 5,661,506 A | 8/1997 | Lazzouni et al. | |
| 5,661,783 A | 8/1997 | Assis | |
| 5,682,330 A | 10/1997 | Seaman et al. | |
| 5,682,540 A | 10/1997 | Klotz, Jr. et al. | |
| 5,690,496 A | 11/1997 | Kennedy | |
| 5,706,097 A | 1/1998 | Schelling et al. | |
| 5,717,841 A | 2/1998 | Farrell et al. | |
| 5,721,883 A * | 2/1998 | Katsuo et al. | 345/505 |
| 5,729,665 A | 3/1998 | Gauthier | |
| 5,749,735 A | 5/1998 | Redford et al. | |
| 5,757,897 A * | 5/1998 | LaBarbera et al. | 379/165 |
| 5,761,380 A * | 6/1998 | Lewis et al. | 706/47 |
| 5,764,368 A | 6/1998 | Shibaki et al. | |
| 5,774,260 A | 6/1998 | Petitto et al. | |
| 5,793,869 A | 8/1998 | Claflin, Jr. | |
| 5,804,803 A | 9/1998 | Cragun et al. | |
| 5,845,144 A | 12/1998 | Tateyama et al. | |
| 5,877,764 A * | 3/1999 | Feitelson et al. | 715/808 |
| 5,884,056 A | 3/1999 | Steele | |
| 5,903,538 A | 5/1999 | Fujita et al. | |
| 5,936,542 A | 8/1999 | Kleinrock et al. | |
| 5,938,727 A | 8/1999 | Ikeda | |
| 5,940,776 A | 8/1999 | Baron et al. | |
| 5,941,936 A | 8/1999 | Taylor | |
| 5,945,998 A | 8/1999 | Eick | |
| 5,949,879 A | 9/1999 | Berson et al. | |
| 5,962,839 A | 10/1999 | Eskildsen | |
| 5,974,189 A | 10/1999 | Nicponski | |
| 5,987,226 A | 11/1999 | Ishikawa et al. | |
| 5,999,173 A | 12/1999 | Ubillos | |
| 6,000,030 A | 12/1999 | Steinberg et al. | |
| 6,006,241 A | 12/1999 | Purnaveja et al. | |
| 6,020,916 A | 2/2000 | Gerszberg et al. | |
| 6,038,567 A | 3/2000 | Young | |
| 6,043,904 A | 3/2000 | Nickerson | |
| 6,076,733 A | 6/2000 | Wilz, Sr. et al. | |
| 6,076,734 A | 6/2000 | Dougherty et al. | |
| 6,081,261 A | 6/2000 | Wolff et al. | |
| 6,098,106 A | 8/2000 | Philyaw et al. | |
| 6,106,457 A | 8/2000 | Perkins et al. | |
| 6,108,656 A | 8/2000 | Durst et al. | |
| 6,111,567 A | 8/2000 | Savchenko et al. | |
| 6,115,718 A | 9/2000 | Huberman et al. | |
| 6,118,888 A * | 9/2000 | Chino et al. | 382/118 |
| 6,123,258 A | 9/2000 | Iida | |
| 6,125,229 A | 9/2000 | Dimitrova et al. | |
| 6,138,151 A | 10/2000 | Reber et al. | |
| 6,141,001 A | 10/2000 | Baleh | |
| 6,148,094 A | 11/2000 | Kinsella | |
| 6,152,369 A | 11/2000 | Wilz, Sr. et al. | |
| 6,153,667 A | 11/2000 | Howald | |
| 6,167,033 A | 12/2000 | Chang et al. | |
| 6,170,007 B1 | 1/2001 | Venkatraman et al. | |
| 6,175,489 B1 | 1/2001 | Markow et al. | |
| 6,189,009 B1 | 2/2001 | Stratigos et al. | |
| 6,193,658 B1 | 2/2001 | Wendelken et al. | |
| 6,199,042 B1 | 3/2001 | Kurzweil | |
| 6,256,638 B1 | 7/2001 | Dougherty et al. | |
| 6,296,693 B1 * | 10/2001 | McCarthy | 96/117.5 |
| 6,297,812 B1 | 10/2001 | Ohara et al. | |
| 6,297,851 B1 | 10/2001 | Taubman et al. | |
| 6,298,145 B1 | 10/2001 | Zhang et al. | |
| 6,302,527 B1 | 10/2001 | Walker | |
| 6,307,956 B1 | 10/2001 | Black | |
| 6,308,887 B1 | 10/2001 | Korman et al. | |
| 6,330,976 B1 | 12/2001 | Dymetman et al. | |
| 6,360,057 B1 | 3/2002 | Tsumagari et al. | |
| 6,369,811 B1 | 4/2002 | Graham et al. | |
| 6,373,498 B1 * | 4/2002 | Abgrall | 345/619 |
| 6,373,585 B1 | 4/2002 | Mastie et al. | |
| 6,375,298 B2 | 4/2002 | Purcell et al. | |
| 6,378,070 B1 | 4/2002 | Chan et al. | |
| 6,400,996 B1 | 6/2002 | Hoffberg et al. | |
| 6,417,435 B2 | 7/2002 | Chantzis et al. | |
| 6,421,738 B1 | 7/2002 | Ratan et al. | |
| 6,439,465 B1 | 8/2002 | Bloomberg | |
| 6,442,336 B1 | 8/2002 | Lemelson | |
| 6,452,615 B1 | 9/2002 | Chiu et al. | |
| 6,466,534 B2 | 10/2002 | Cundiff, Sr. | |
| 6,476,793 B1 * | 11/2002 | Motoyama et al. | 345/589 |
| 6,476,834 B1 | 11/2002 | Doval et al. | |
| 6,502,114 B1 | 12/2002 | Forcier | |
| D468,277 S | 1/2003 | Sugiyama | |
| 6,502,756 B1 | 1/2003 | Fåhraeus | |
| 6,504,620 B1 | 1/2003 | Kinjo | |
| 6,515,756 B1 | 2/2003 | Mastie et al. | |
| 6,519,360 B1 | 2/2003 | Tanaka | |
| 6,529,920 B1 | 3/2003 | Arons et al. | |
| 6,535,639 B1 | 3/2003 | Uchihachi et al. | |
| 6,544,294 B1 | 4/2003 | Greenfield et al. | |
| 6,552,743 B1 | 4/2003 | Rissman | |
| 6,568,595 B1 | 5/2003 | Russell et al. | |
| 6,581,070 B1 | 6/2003 | Gibbon et al. | |
| 6,587,859 B2 | 7/2003 | Dougherty et al. | |
| 6,593,860 B2 | 7/2003 | Lai et al. | |
| 6,594,377 B1 * | 7/2003 | Kim et al. | 382/117 |
| 6,611,276 B1 * | 8/2003 | Muratori et al. | 715/772 |
| 6,611,622 B1 * | 8/2003 | Krumm | 382/170 |
| 6,611,628 B1 | 8/2003 | Sekiguchi et al. | |
| 6,625,334 B1 | 9/2003 | Shiota et al. | |
| 6,647,534 B1 | 11/2003 | Graham | |

| | | |
|---|---|---|
| 6,647,535 B1 | 11/2003 | Bozdagi et al. |
| 6,654,887 B2 | 11/2003 | Rhoads |
| 6,665,092 B2 | 12/2003 | Reed |
| 6,674,538 B2 | 1/2004 | Takahashi |
| 6,678,389 B1 | 1/2004 | Sun et al. |
| 6,687,383 B1 | 2/2004 | Kanevsky et al. |
| 6,700,566 B2 | 3/2004 | Shimoosawa et al. |
| 6,701,369 B1 | 3/2004 | Philyaw |
| 6,724,494 B1 | 4/2004 | Danknick |
| 6,728,466 B1 | 4/2004 | Tanaka |
| 6,745,234 B1 | 6/2004 | Philyaw et al. |
| 6,750,978 B1 | 6/2004 | Marggraff et al. |
| 6,753,883 B2 | 6/2004 | Schena et al. |
| 6,771,283 B2 | 8/2004 | Carro |
| 6,772,947 B2 | 8/2004 | Shaw |
| 6,774,951 B2 | 8/2004 | Narushima |
| 6,775,651 B1 | 8/2004 | Lewis et al. |
| 6,807,303 B1 | 10/2004 | Kim et al. |
| 6,824,044 B1 | 11/2004 | Lapstun et al. |
| 6,845,913 B2 | 1/2005 | Madding et al. |
| 6,853,980 B1 | 2/2005 | Ying et al. |
| 6,856,415 B1 | 2/2005 | Simchik et al. |
| 6,871,780 B2 | 3/2005 | Nygren et al. |
| 6,877,134 B1 | 4/2005 | Fuller et al. |
| 6,883,162 B2 | 4/2005 | Jackson et al. |
| 6,886,750 B2 | 5/2005 | Rathus et al. |
| 6,892,193 B2 | 5/2005 | Bolle et al. |
| 6,898,709 B1 | 5/2005 | Teppler |
| 6,904,168 B1 | 6/2005 | Steinberg et al. |
| 6,904,451 B1 | 6/2005 | Orfitelli et al. |
| 6,923,721 B2 | 8/2005 | Luciano et al. |
| 6,931,594 B1 | 8/2005 | Jun |
| 6,938,202 B1 | 8/2005 | Matsubayashi et al. |
| 6,946,672 B1 | 9/2005 | Lapstun et al. |
| 6,950,623 B2 | 9/2005 | Brown et al. |
| 6,964,374 B1 | 11/2005 | Djuknic et al. |
| 6,966,495 B2 | 11/2005 | Lynggaard et al. |
| 6,983,482 B2 | 1/2006 | Morita et al. |
| 7,000,193 B1* | 2/2006 | Impink et al. ............... 715/771 |
| 7,023,459 B2* | 4/2006 | Arndt et al. ............... 715/764 |
| 7,031,965 B1 | 4/2006 | Moriya et al. |
| 7,075,676 B2 | 7/2006 | Owen |
| 7,079,278 B2 | 7/2006 | Sato |
| 7,089,420 B1 | 8/2006 | Durst et al. |
| 7,092,568 B2 | 8/2006 | Eaton |
| 7,131,058 B1 | 10/2006 | Lapstun |
| 7,134,016 B1 | 11/2006 | Harris |
| 7,149,957 B2 | 12/2006 | Hull et al. |
| 7,151,613 B1 | 12/2006 | Ito |
| 7,152,206 B1 | 12/2006 | Tsuruta |
| 7,162,690 B2 | 1/2007 | Gupta et al. |
| 7,174,151 B2 | 2/2007 | Lynch et al. |
| 7,181,502 B2 | 2/2007 | Incertis |
| 7,196,808 B2 | 3/2007 | Kofman et al. |
| 7,215,436 B2 | 5/2007 | Hull et al. |
| 7,228,492 B1 | 6/2007 | Graham |
| 7,263,659 B2 | 8/2007 | Hull et al. |
| 7,263,671 B2 | 8/2007 | Hull et al. |
| 7,280,738 B2 | 10/2007 | Kauffman et al. |
| 7,298,512 B2 | 11/2007 | Reese et al. |
| 2001/0003846 A1* | 6/2001 | Rowe et al. ............... 725/47 |
| 2001/0017714 A1 | 8/2001 | Komatsu et al. |
| 2001/0037408 A1 | 11/2001 | Thrift et al. |
| 2001/0052942 A1 | 12/2001 | MacCollum et al. |
| 2002/0001101 A1 | 1/2002 | Hamura et al. |
| 2002/0004807 A1 | 1/2002 | Graham et al. |
| 2002/0006100 A1 | 1/2002 | Cundiff, Sr. et al. |
| 2002/0010641 A1* | 1/2002 | Stevens et al. ............... 705/26 |
| 2002/0011518 A1 | 1/2002 | Goetz et al. |
| 2002/0015066 A1 | 2/2002 | Siwinski et al. |
| 2002/0023957 A1 | 2/2002 | Michaelis et al. |
| 2002/0048224 A1 | 4/2002 | Dygert et al. |
| 2002/0051010 A1 | 5/2002 | Jun et al. |
| 2002/0060748 A1 | 5/2002 | Aratani et al. |
| 2002/0066782 A1 | 6/2002 | Swaminathan et al. |
| 2002/0067503 A1 | 6/2002 | Hiatt |
| 2002/0078149 A1 | 6/2002 | Chang et al. |
| 2002/0087530 A1 | 7/2002 | Smith et al. |
| 2002/0087598 A1 | 7/2002 | Carro |
| 2002/0095501 A1 | 7/2002 | Chiloyan et al. |
| 2002/0099534 A1 | 7/2002 | Hegarty |
| 2002/0101513 A1* | 8/2002 | Halverson ............... 348/207 |
| 2002/0131071 A1 | 9/2002 | Parry |
| 2002/0131078 A1 | 9/2002 | Tsukinokizawa |
| 2002/0134699 A1 | 9/2002 | Bradfield et al. |
| 2002/0135800 A1 | 9/2002 | Dutta |
| 2002/0137544 A1 | 9/2002 | Myojo |
| 2002/0140993 A1 | 10/2002 | Silverbrook |
| 2002/0159637 A1 | 10/2002 | Echigo et al. |
| 2002/0165769 A1 | 11/2002 | Ogaki et al. |
| 2002/0169849 A1 | 11/2002 | Schroath |
| 2002/0171857 A1 | 11/2002 | Hisatomi et al. |
| 2002/0185533 A1 | 12/2002 | Shieh et al. |
| 2002/0199149 A1 | 12/2002 | Nagasaki et al. |
| 2003/0002068 A1 | 1/2003 | Constantin et al. |
| 2003/0007776 A1 | 1/2003 | Kameyama et al. |
| 2003/0014615 A1 | 1/2003 | Lynggaard |
| 2003/0024975 A1 | 2/2003 | Rajasekharan |
| 2003/0025951 A1 | 2/2003 | Pollard et al. |
| 2003/0038971 A1 | 2/2003 | Renda |
| 2003/0051214 A1 | 3/2003 | Graham et al. |
| 2003/0065925 A1 | 4/2003 | Shindo et al. |
| 2003/0076521 A1 | 4/2003 | Li et al. |
| 2003/0084462 A1 | 5/2003 | Kubota et al. |
| 2003/0088582 A1 | 5/2003 | Pflug |
| 2003/0093384 A1 | 5/2003 | Durst et al. |
| 2003/0110926 A1 | 6/2003 | Sitrick et al. |
| 2003/0117652 A1 | 6/2003 | Lapstun |
| 2003/0121006 A1 | 6/2003 | Tabata et al. |
| 2003/0128877 A1 | 7/2003 | Nicponski |
| 2003/0160898 A1 | 8/2003 | Baek et al. |
| 2003/0177240 A1 | 9/2003 | Gulko et al. |
| 2003/0187642 A1 | 10/2003 | Ponceleon et al. |
| 2003/0218597 A1 | 11/2003 | Hodzic et al. |
| 2003/0220988 A1* | 11/2003 | Hymel ............... 709/220 |
| 2003/0231198 A1 | 12/2003 | Janevski |
| 2004/0024643 A1 | 2/2004 | Pollack et al. |
| 2004/0036842 A1 | 2/2004 | Tsai et al. |
| 2004/0039723 A1 | 2/2004 | Lee et al. |
| 2004/0044894 A1 | 3/2004 | Lofgren et al. |
| 2004/0049681 A1 | 3/2004 | Diehl et al. |
| 2004/0118908 A1 | 6/2004 | Ando et al. |
| 2004/0125402 A1 | 7/2004 | Kanai et al. |
| 2004/0128514 A1 | 7/2004 | Rhoads |
| 2004/0128613 A1 | 7/2004 | Sinisi |
| 2004/0143459 A1 | 7/2004 | Engelson et al. |
| 2004/0143602 A1 | 7/2004 | Ruiz et al. |
| 2004/0156616 A1 | 8/2004 | Strub et al. |
| 2004/0167895 A1 | 8/2004 | Carro |
| 2004/0184064 A1 | 9/2004 | Takeda et al. |
| 2004/0207876 A1 | 10/2004 | Aschenbrenner et al. |
| 2004/0215470 A1 | 10/2004 | Bodin |
| 2004/0229195 A1 | 11/2004 | Marggraff et al. |
| 2004/0240541 A1 | 12/2004 | Chadwick et al. |
| 2004/0249650 A1 | 12/2004 | Freedman et al. |
| 2005/0038794 A1 | 2/2005 | Piersol |
| 2005/0064935 A1 | 3/2005 | Blanco |
| 2005/0083413 A1 | 4/2005 | Reed et al. |
| 2005/0125717 A1 | 6/2005 | Segal et al. |
| 2005/0149849 A1 | 7/2005 | Graham et al. |
| 2005/0213153 A1 | 9/2005 | Hull et al. |
| 2005/0216838 A1 | 9/2005 | Graham |
| 2005/0216852 A1 | 9/2005 | Hull et al. |
| 2006/0043193 A1 | 3/2006 | Brock |
| 2006/0136343 A1 | 6/2006 | Coley et al. |
| 2006/0171559 A1 | 8/2006 | Rhoads |

| | | | |
|---|---|---|---|
| 2006/0250585 | A1 | 11/2006 | Anderson et al. |
| 2007/0033419 | A1 | 2/2007 | Kocher et al. |
| 2007/0065094 | A1 | 3/2007 | Chien et al. |
| 2007/0109397 | A1 | 5/2007 | Yuan et al. |
| 2007/0162858 | A1 | 7/2007 | Hurley et al. |
| 2007/0168426 | A1 | 7/2007 | Ludwig et al. |
| 2007/0268164 | A1 | 11/2007 | Lai et al. |

FOREIGN PATENT DOCUMENTS

| | | |
|---|---|---|
| CN | 1352765 A | 6/2002 |
| CN | 1097394 C | 12/2002 |
| EP | 1133170 A2 | 9/2001 |
| WO | WO 99/18523 | 4/1999 |
| WO | WO 00/43862 A1 | 7/2000 |
| WO | WO 02/082316 A1 | 10/2002 |

OTHER PUBLICATIONS

"Performance Analysis of Median Filtering on MeikoTM—A Distributed Multiprocessor System", by K.M. Poon and N.H.C. Yung, IEEE First International Conference on Algorithms and Architectures for Parallel Processing, pp. 631-639.*

User Interface Design: A Software Engineering Perspective, by Soren Lauesen, preface to p. 11, copyright 2005.*

ASCII 24.com, [online](date unknown), Retrieved from the Internet<URL:http://216.239.37.104/search?q=cache:z-G9M1EpvSUJ:ascii24.com/news/i/hard/article/1998/10/01/612952-000.html+%E3%82%B9%E3%...>.

Configuring A Printer (NT), Oxford Computer Support [Online] [Retrieved on Nov. 13, 2003] Retrieved from the Internet<URL: http://www.nox.ac.uk/cehoxford/ccs/facilities/printers/configurnt.htm>.

"DocumentMall Secure Document Management" [online] [Retrieved on Mar. 9, 2004). Retrieved from the Internet <URL: http://www.documentmall.com>.

Girgensohn, Andreas et al., "Time-Constrained Keyframe Selection Technique," Multimedia Tools and Applications (2000), vol. 11, pp. 347-358.

Graham, Jamey et al., "A Paper-Based Interface for Video Browsing and Retrieval," IEEE International Conference on Multimedia and Expo (Jul. 6-9, 2003), vol. 2, P:II 749-752.

Graham, Jamey et al., "The Video Paper Multimedia Playback System," Proceedings of the 11th ACM International Conference on Multimedia (Nov. 2003), pp. 94-95.

Graham, Jamey et al., "Video Paper: A Paper-Based Interface for Skimming and Watching Video," International Conference on Consumer Electronics (Jun. 16-18, 2002), pp. 214-215.

Hull, Jonathan J. et al., "Visualizing Multimedia Content on Paper Documents: Components of Key Frame Selection for Video Paper," Proceedings of the 7th International Conference on Document Analysis and Recognition (2003), vol. 1, pp. 389-392.

"Kofax: Ascent Capture: Overview" [online] [Retrieved on Jan. 22, 2004]. Retrieved form the Internet: <URL http://www.kofax.com/products/ascent/capture>.

Label Producer by Maxell, [online] [Retrieved on Nov. 11, 2003]. Retrieved from the Internet<URL: http://www.maxell.co.jp/products/consumer/rabel_card/>.

Movie-PhotoPrint by Canon, [online] [Retrieved on Nov. 11, 2003]. Retrieved from the Internet<URL: http://cweb.cannon.jp/hps/guide/rimless.html>.

PostScript Language Document Structuring Conventions Specification, Version 3.0 (Sep. 25, 1992), Adobe Systems Incorporated.

Print From Cellular Phone by Canon, [online] [Retrieved on Nov. 11, 2003]. Retrieved from the Internet<URL:http://cweb.canon.jp/bj/enjoy/pbeam/index.html>.

Print Images Plus Barcode by Fuji Xerox, [online] [Retrieved on Nov. 11, 2003]. Retrieved from the Internet<URL:http://www.fujixerox.co.jp/soft/cardgear/release.html>.

Print Scan—Talk By Barcode by Epson, [online] [Retrieved on Nov. 11, 2003]. Retrieved from the Internet<URL:http://www.epson.co.jp/osirase/2000/000217.htm>.

Printer With CD/DVD Tray, Print CD/DVD Label by Epson, [online] [Retrieved on Nov. 11, 2003]. Retrieved from the Internet<URL: http://www.i-love-epson.co.jp/products/printer/inkjet/pmd750/pmd7503.htm>.

R200 Scan Talk [online] (date unknown). Retrieved from the Internet<URL: http://homepage2.nifty.com/vasolza/ScanTalk.htm>.

Variety of Media In, Print Paper Out by Epson, [online] [Retrieved on Nov. 11, 2003]. Retrieved from the Internet<URL: http://www.i-love-epson.co.jp/products/spc/pma850/pma8503.htm>.

Gropp, W. et al., "Using MPI—Portable Programming with the Message-Passing Interface," copyright 1999, pp. 35-42, second edition, MIT Press.

"Seiko Instruments USA, Inc.—Business and Home Office Products" online, date unknown, Seiko Instruments USA, Inc., [retrieved on Jan. 25, 2005]. Retrieved from the Internet: <URL:http://www.siibusinessproducts.com/products/link-ir-p-html>.

"Tasty FotoArt" [online], date unknown, Tague Technologies, Inc., [retrieved on Mar. 8, 3005]. Retrieved from the Internet: <URL:http//www.tastyfotoart.com>.

Gropp, W. et al., "Using MPI-Portable Programming with the Message Passing Interface," copyright 1999, pp. 35-42, second edition, MIT Press.

Dimitrova, N. et al., "Applications of Video-Content Analysis and Retrieval ," IEEE Multimedia, Jul.-Sep. 2002, pp. 42-55.

European Search Report, EP 04255836, Sep. 12, 2006, 4 pages.

European Search Report, EP 04255837, Sep. 5, 2006, 3 pages.

European Search Report, EP 04255839, Sep, 4, 2006, 3 pages.

European Search Report, EP 04255840, Sep. 12, 2006, 3 pages.

Graham, J. et al., "A Paper-Based Interface for Video Browsing and Retrieval," ICME '03, Jul. 6-9, 2003. pp. 749-752, vol. 2.

Graham, J. et al., "Video Paper: A Paper-Based Interface for Skimming and Watching Video," ICCE '02, Jun. 18-20, 2002, pp. 214-215.

Klemmer, S.R. et al., "Books With Voices: Paper Transcripts as a Tangible Interface to Oral Histories," CHI Letters, Apr. 5-10, 2003, pp. 89-96, vol. 5, Issue 1.

Minami, K. et al., "Video Handling with Music and Speech Detection," IEEE Multimedia, Jul.-Sep. 1998, pp. 17-25.

Shahraray, B. et al, "Automated Authoring of Hypermedia Documents of Video Programs," ACM Multimedia '95 Electronic Proceedings, San Francisco, CA, Nov. 5-9, 1995, pp. 1-12.

Shahraray, B. et al., "Pictorial Transcripts: Multimedia Processing Applied to Digital Library Creation," IEEE, 1997, pp. 581-586.

ASCII 24.com, [online] (date unknown), Retrieved from the Internet<URL: http://216.239.37.104/search?q=cache:z-G9M1EpvSUJ:ascii24.com/news/i/hard/article/1998/10/01/612952-000.html+%E3%82%B9%E3%...>.

Label Producer by Maxell, [online] [Retrieved on Nov. 11, 2003]. Retrieved from the Internet<URL: http://www.maxell.co.jp/products/consumer/rabel_card/>.

Print Scan-Talk By Barcode by Epson, [online] [Retrieved on Nov. 11, 2003]. Retrieved from the Internet<URL: http://www.epson.co.jp/osirase/2000/000217:htm>.

R200 ScanTalk [online] (date unknown). Retrieved from the Internet<URL: http://homepage2.nifty.com/vasolza/ScanTalk.htm>.

Lamming, M. et al., "Using Automatically Generated Descriptions of Human Activity to Index Multi-media Data," IEEE Multimedia Communications and Applications IEE Colloquium, Feb. 7, 1991, pp. 5/1-5/3.

Stifelman, L. et al., "The Audio Notebook," SIGCHI 2001, Mar. 31-Apr. 5, 2001, pp. 182-189, vol. 3, No. 1, Seattle, WA.

Communication Pursuant to Article 96(2) EPC, European Application No. 04255836.1, Jun. 11, 2007, 10 pages.

Chinese Application No. 2004100849823 Office Action, Jun. 1, 2007, 24 pages.

Chinese Application No. 2004100897988 Office Action , Apr. 6, 2007, 8 pages.

Arai, T. et al., "PaperLink: A Technique for Hyperlinking from Real Paper to Electronic Content," CHI 97, Atlanta, GA, Mar. 22-27, 1997, pp. 327-334.

Dorai, C. et al., "End-to-End Video Text Recognition for Multimedia Content Analysis," IEEE, International Conference on Multimedia and Expo, Aug. 2001, pp. 601-604.

Hecht, D.L., "Printed Embedded Data Graphical User Interfaces," Computer, Mar. 2001, pp. 47-55, vol. 34, Issue 3.

Klemmer, S.R. et al., "Books with Voices: Paper Transcripts as a Tangible Interface to Oral Histories," CHI 2003, Fort Lauderdale, FL, Apr. 5-10, 2003, pp. 89-96.

Karasik, Image Processing in Perl graphic applications, Google Apr. 2, 2003, pp. 1-12.

Hardman, L. et al, "Integrating the Amsterdam Hypermedia Model with the Standard Reference Model for Intelligent Multimedia Presentation Systems," Computer Standards & Interfaces, 1997, pp. 497-507, vol. 18.

* cited by examiner

USER INTERFACE FOR NETWORKED PRINTER

CROSS REFERENCE TO RELATED APPLICATIONS

This application claims the benefit of the following provisional patent applications, each of which is incorporated by reference in its entirety: U.S. Provisional Application No. 60/506,206, filed Sep. 25, 2003; U.S. Provisional Application No. 60/506,263, filed Sep. 25, 2003; U.S. Provisional Application No. 60/506,302, filed Sep. 25, 2003; U.S. Provisional Application No. 60/506,303, filed Sep. 25, 2003; and U.S. Provisional Application No. 60/506,411, filed Sep. 25, 2003.

This application is also related to the following applications, each of which was filed on Mar. 30, 2004, and is incorporated by reference herein in its entirety: application Ser. No. 10/814,948, entitled, "Networked Printing System Having Embedded Functionality for Printing Time-Based Media," application Ser. No. 10/814,700, entitled, "Printer User Interface," application Ser. No. 10/814,845, entitled, "Stand Alone Multimedia Printer With User Interface for Allocating Processing," and application Ser. No. 10/814,944, "Multimedia Print Driver Dialog Interfaces,".

BACKGROUND OF THE INVENTION

1. Field of the Invention

This invention relates generally to printers that have embedded functionality for printing time-based media, and in particular to a user interface for operating a printer that prints time-based media resulting in a combination of a printed output and a related electronic data output.

2. Description of the Related Art

While conventional printers can print documents in a wide variety of formats, these printers are fundamentally limited in their ability to reproduce different kinds of media. For example, it is standard technology for a printer to produce images of static text, pictures, or a combination of the two. But because these printers print onto paper or another similar fixed medium, they cannot record the nuances of time-based media very well.

In developing a printer that is equipped to print time-based media without the limitations of conventional printers, a user interface for controlling such a printer is needed. It is further desirable that such a user interface be operable with a printer that performs at least some of the necessary processing itself rather than requiring an attached computer or other device to perform all of the processing. Ideally, the user interface should allow a user to specify how much processing is done by the printer.

SUMMARY OF THE INVENTION

A multifunction printer enables the printing of time-based media. In a typical hardware configuration for such a multifunction printer, a printer includes a print engine that produces a paper or other printed output and one or more electronic devices the produce a related electronic output. Together, the printed and electronic outputs provide an improved representation of the time-based media over that of a convention paper printer.

A user interface provides access to functionality of the printer. In a preferred embodiment, the user interface includes a touch screen for accepting command inputs and providing information to a user. In one alternative embodiment, input is provided by way of a keypad, keyboard, or other input device. In another embodiment, the user interface is located on a device connected to the printer via a network.

Time-based media data is received by the printer from a media source specified via the user interface. A user specifies one or more multimedia processing functions for the printer to apply to the data. The printer performs the specified functions, and previews the output to the user via a display of the user interface. If the user decides to print the previewed output, the user specifies one or more output devices, such that the printer can print conventional printed output and/or to a specified electronic output. In one embodiment, the user interface enables a user to specify a proportion of processing work that is done by the printer, and a proportion done by another device.

The figures depict preferred embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE PREFERRED EMBODIMENTS

Various embodiments of a multifunction printer enable the printing of time-based media in a useful and intelligent format. To create a representation of this time-based media, the printer produces a printed output and a related electronic output, which together provide a representation of the received media. Depending on the desired application for the printer, the printer may include any number of devices for receiving the media, printing the printed output, and producing the electronic output. The described user interface is meant to be generally applicable not only to the specific combinations of input and output devices described herein, but also to additional combinations not specifically disclosed, as would be understood by those of skill in the art from the present disclosure.

Printer Architecture

Figure 1:
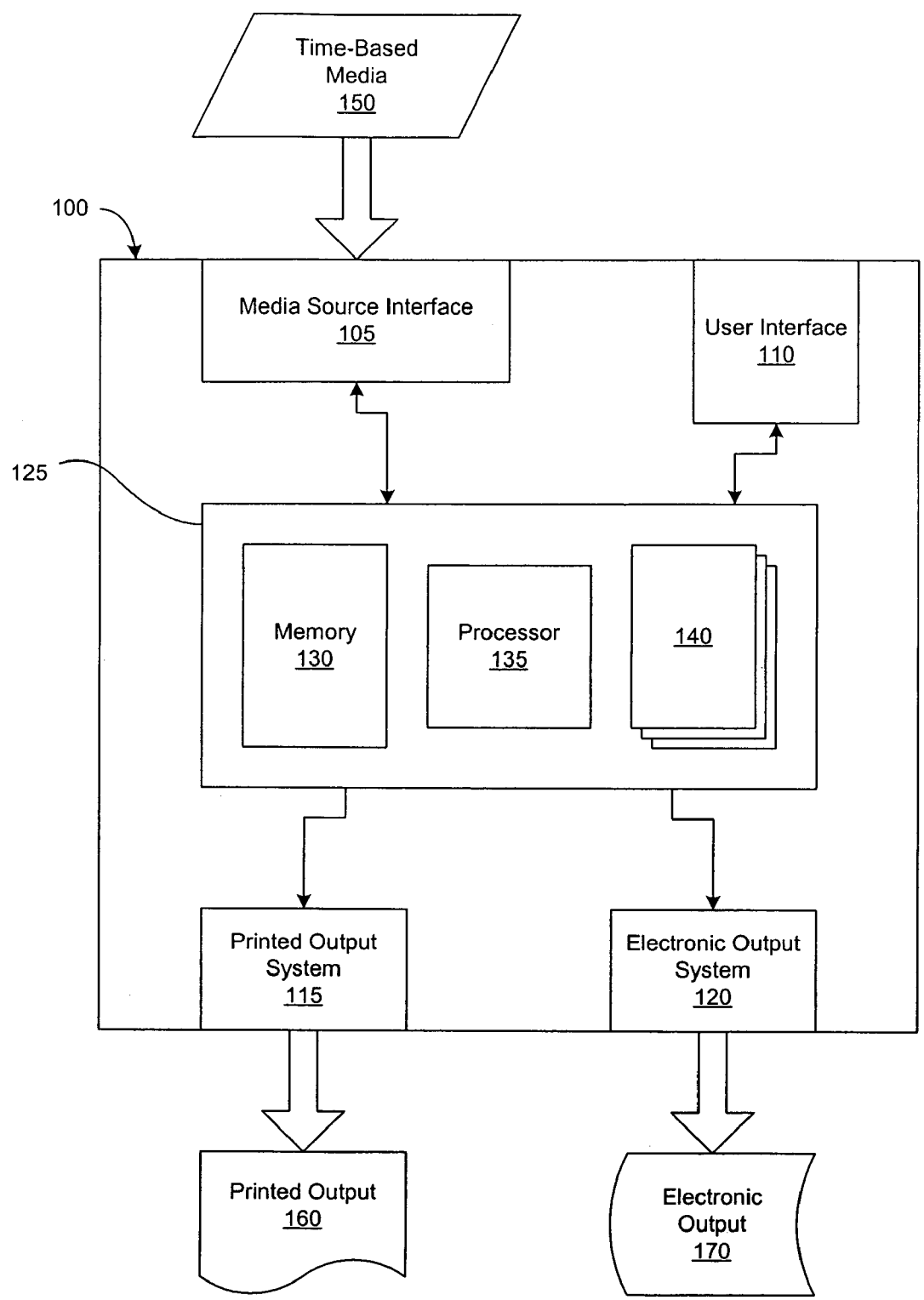
FIG. 1 is a block diagram illustrating a printer having a user interface in accordance with an embodiment of the present invention.

FIG. 1 is a high-level diagram of one embodiment of the printer 100. Printer 100 includes a media source interface 105, a user interface 110, a printed output system 115, an electronic output system 120, and a media processing system 125. Capable of receiving time-based media 150, the media source interface 105 can take a variety of forms and may include one or more devices that can receive media data or create media data by observing a media event. Similarly, the printed output system 115 and the electronic output system 120 can take a variety of forms and may each include one or more devices that can produce, respectively, a printed output 160 and an electronic output 170.

In one embodiment, the media processing system 125 includes a memory 130, a processor 135, and one or more embedded functionality modules 140. The embedded functionality modules 140 may include software, hardware, or a combination thereof for implementing at least a portion of the functionality of the multifunction printer 100. The media processing system 125 is coupled to the media source interface 105 and the user interface 110, allowing it to communicate with each of those devices. The media processing system 125 is also coupled to the printed output system 115 and to the electronic output system 120 for providing the appropriate commands and data to those systems.

Figure 2:
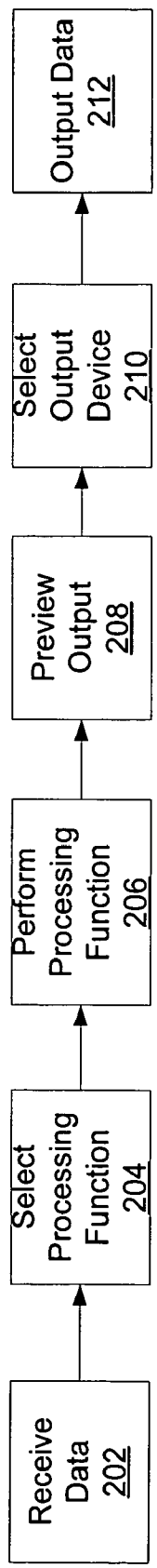
FIG. 2 illustrates an overview of a generalized process for creating a representation of time-based media data in accordance with an embodiment of the present invention.

Printer 100 is further described in related application entitled "Networked Printing System Having Embedded Functionality for Printing Time-Based Media," to Hart et. al, filed Mar. 30, 2004, which application is incorporated by reference in its entirety FIG. 2 illustrates an overview of a generalized process in which the printer 100 creates a representation of time-based media data 150, in accordance with one embodiment of the invention. First in the illustrated embodiment, time-based media data is received 202 by the printer 100. Using UI 110, a user selects 204 a processing function to be performed on the data. Printer 100 then performs 206 the specified processing function, and previews 208 the output for the user. If the user is satisfied with the data as previewed, he selects 210 one or more output devices to which to send the time-based media data, and finally instructs printer 100 to output 212 the data. Each of the above steps is now described in greater detail.

User interface (UI) 110 of printer 100 preferably includes a screen on which information can be conveyed to the user. UI 110 preferably also includes a mechanism for allowing a user to input responses and make selections. In a preferred embodiment, printer UI 110 includes a touch screen, and the user makes selections and inputs responses by touching the appropriate part of the screen. In one embodiment, a keypad is also provided for entry of alphanumeric data. In an alternative embodiment, a joystick, trackball or other input device can be used to provide input and make selections.

Figure 3:
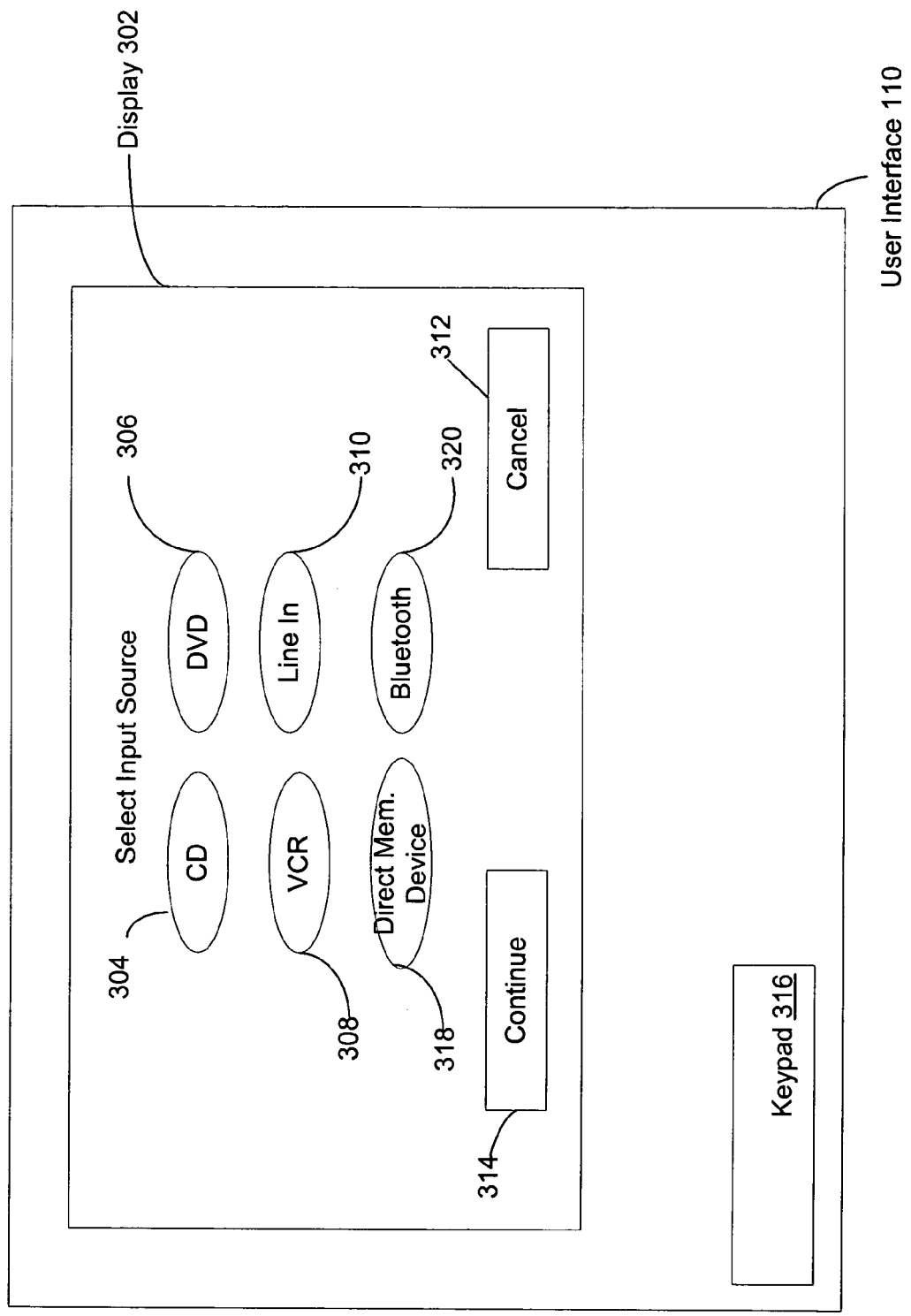
FIG. 3 illustrates an example of a user interface for selecting an input source in accordance with an embodiment of the present invention.

FIG. 3 illustrates an example of a user interface 110 for selecting an input source. Display 302 of UI 110 includes an instruction to the user to "select input source", and several selections for the user to choose from. In the illustrated embodiment, the user can select from CD 304, DVD 306, VCR 308 and Line In 310, Direct Memory Device 318 and Bluetooth device 320. Those of skill in the art will appreciate that in other embodiments, other input sources will be available. Also shown is a Cancel button 312, should the user wish to cancel the action of selecting an input source, and a Continue button 314 for finalizing the selection. In a preferred embodiment, the user makes a selection by touching the appropriate button on the screen. In an alternative embodiment, the user can make the selection by pressing an appropriate button on keypad 316.

Once a data source has been specified so that data can be received 202, a multimedia processing function is selected. In a preferred embodiment, processing functions include audio range selection and video range selection.

Audio Range Selection

Figure 4:
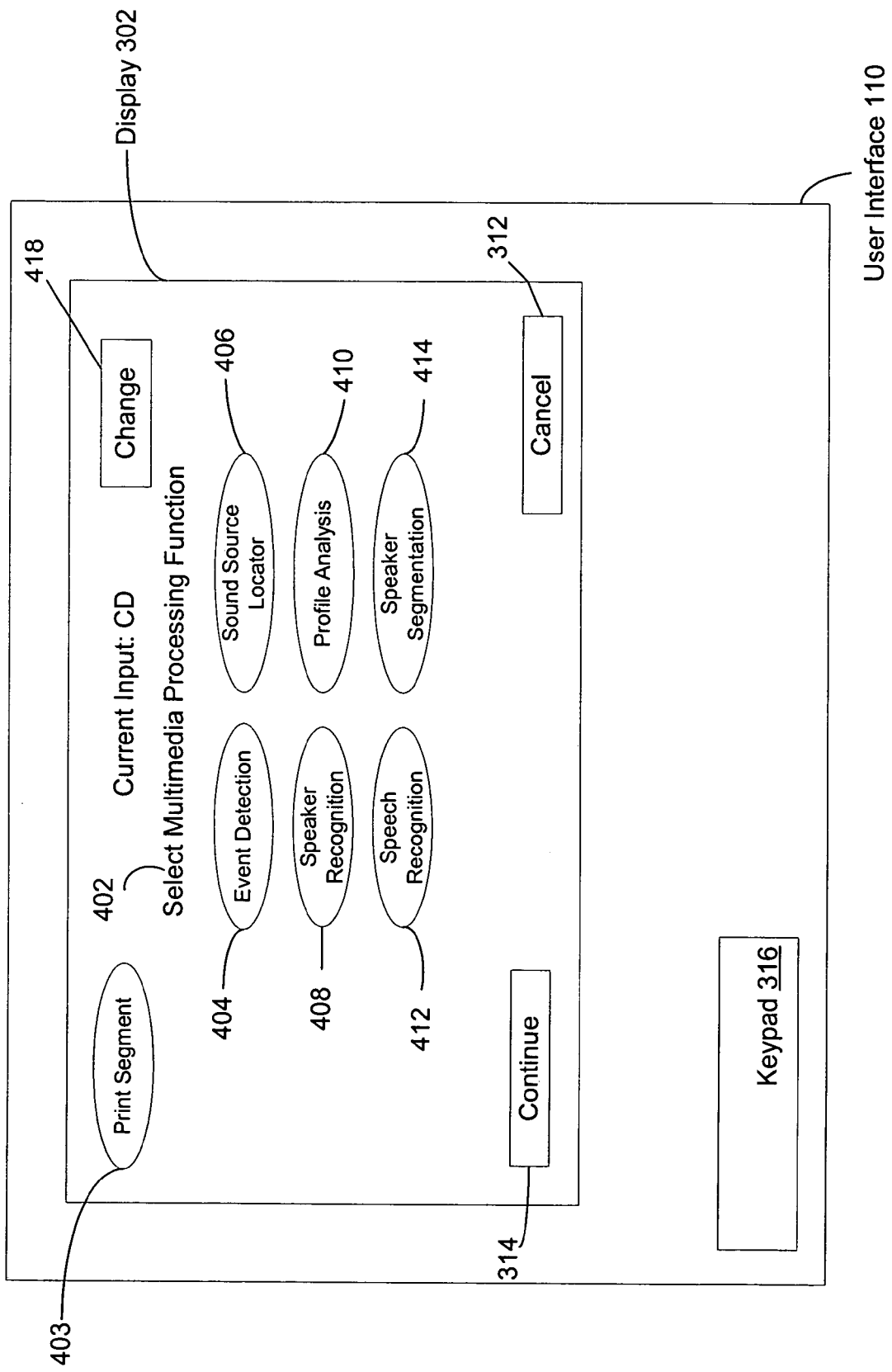
FIG. 4 illustrates a user interface display for selecting an audio multimedia processing function in accordance with an embodiment of the present invention.

In a preferred embodiment, printer 100 is capable of performing many kinds of multimedia processing functions on the audio selection. Available functions preferably include event detection, speaker segmentation, speaker recognition, sound source location, speech recognition and profile analysis. As can be seen in FIG. 4, user interface 110 provides a user with the ability to select from among these options. In FIG. 4, display 302 of UI 110 includes a user instruction 402, instructing the user to select the desired multimedia processing function. Display 302 also includes the available options, which in the illustrated case are print segment 403, event detection 404, sound source locator 406, speaker recognition 408, profile analysis 410, speech recognition 412, and speaker segmentation 414. A button 314 is also provided in one embodiment to allow the current input to be changed, as described above with respect to FIG. 3. Finally, a cancel button 312 is available to allow the user to back to a previous screen, and a continue button 314 is available to be selected when the user has specified all of the desired processing functions.

Selecting one of the multimedia processing functions displays a submenu for the user specific to that processing function.

In one embodiment, if a user selects the Print Segment button 403 on display 302, a dialog appears on display 302 showing an audio waveform and additionally providing slider controls with which the user can select portions of the current input to print. The manner in which output is created by the printer is discussed below.

Selecting the Event Detection button 404 displays a dialog to the user showing the results of applying audio event detection, such as clapping, yelling, or laughing, along a timeline. Each detected event is preferably accompanied by a confidence that it was detected correctly. The display 302 also includes a slider that lets the user adjust a threshold on the confidence values. As the slider is moved, events that are above threshold are displayed. The audio file is then preferably segmented into clips that bound the above-threshold events. In one embodiment, the display 302 also includes a series of check boxes that let the user choose which events to display.

Selecting the Speaker Segmentation button 414 presents a dialog showing the results of applying speaker segmentation along a timeline. Each segment is preferably shown in a different color and segments that were produced by the same speaker are shown in the same color.

Selecting the Speaker Recognition button 408 displays a dialog showing the results of applying speaker recognition along a timeline. In a preferred embodiment, the name of each speaker is accompanied by a confidence that it was detected correctly. The dialog preferably includes a series of check boxes that let the user choose which speakers to display, as well as a slider that lets the user adjust a threshold on the confidence values. As the slider is moved, speaker names that are above threshold are displayed. The audio file is segmented into clips that bound the above-threshold speaker identities.

In another embodiment, Speaker Segmentation and Speaker Recognition functions can be combined. In such an embodiment, a dialog shows the results of applying speaker segmentation and speaker recognition along a timeline. Each segment is shown in a different color and segments that were produced by the same speaker are shown in the same color. Each segment is accompanied by a confidence that the segmentation is correct. The speaker recognition results include text and optionally confidence values for each speaker name. Multiple speaker names could be associated with each segment. The user interface includes sliders that let the user adjust thresholds on confidence values. As the sliders are moved, speaker segments or speaker recognition results that are "above threshold" are displayed.

Selecting the Sound Source Locator button 406 displays a dialog showing the results of applying sound source localization along a timeline. The direction from which sound was detected is displayed as a sector of a circle. Each sector is accompanied by a confidence that it was detected correctly. The dialog additionally preferably includes a series of check boxes arranged around the circumference of a prototype circle that let the user choose which directions to display.

In another embodiment, Event Detection and Sound Source Locator functions can be combined. In such an embodiment, a dialog shows the results of applying sound source localization and audio event detection along a timeline. The direction from which sound was detected is displayed as a sector of a circle. Each sector is accompanied by a confidence that it was detected correctly. The user interface includes a series of check boxes arranged around the circumference of a prototype circle that let the user choose which directions to display. Each detected event is accompanied by a confidence that it was detected correctly. The user interface includes a series of check boxes that let the user choose which events (e.g., clapping, yelling, laughing) to display.

If a user selects the Speech Recognition button 412, a dialog shows the results of applying speech recognition along a timeline. This includes text and optionally confidence values for each word or sentence. The dialog preferably includes a slider that lets the user adjust a threshold on the confidence values. As the slider is moved, words that are above threshold are displayed. The audio file is segmented into clips that bound the above-threshold words.

In another embodiment, the speech recognition results are matched against results from a Profile Analysis 410, in which a pre-existing text-based profile that represents the user's interests. The dialog includes a slider that lets the user adjust a threshold on the confidence values. Another slider adjusts a threshold on the degree of match between the profile and the speech recognition results. As the sliders are moved, words that are above threshold are displayed.

In another embodiment, the user interface also shows the results of applying audio event detection, such as clapping, yelling, or laughing, along a timeline in combination with speech recognition, speaker segmentation, or speaker recognition. Each detected event is accompanied by a confidence that it was detected correctly. The user interface includes sliders that let the user adjust thresholds on the confidence values.

In another embodiment, the functions of Event Detection, Speech Recognition and Speaker Recognition can be combined. In such an embodiment, a dialog shows the results of applying speech recognition along a timeline, and additionally shows the results of applying audio event detection, such as clapping, yelling, or laughing, along a timeline; and the results of applying speaker recognition along the timeline. The dialog includes a series of check boxes that let the user choose which speakers to display, and additionally includes sliders that let the user adjust thresholds on the confidence values.

In another embodiment, Event Detection, Speech Recognition and Speaker Segmentation can be combined. In such an embodiment, a dialog shows the results of applying speech recognition along a timeline, and additionally shows the results of applying audio event detection, such as clapping, yelling, or laughing, along a timeline; and the results of applying speaker segmentation along the timeline. Each segment is shown in a different color and segments that were produced by the same speaker are shown in the same color. The dialog includes sliders that let the user adjust thresholds on the confidence values.

In another embodiment, Speech Recognition, Event Detection and Sound Source Locator functions can be combined. In such an embodiment, a dialog shows the results of applying speech recognition along a timeline, and additionally shows the results of applying audio event detection, such as clapping, yelling, or laughing, along a timeline, and also displays the direction from which sound was detected as a sector of a circle. The dialog includes a series of check boxes arranged around the circumference of a prototype circle that let the user choose which directions to display. The dialog includes sliders that let the user adjust thresholds on the confidence values.

Video Range Selection

Figure 5:
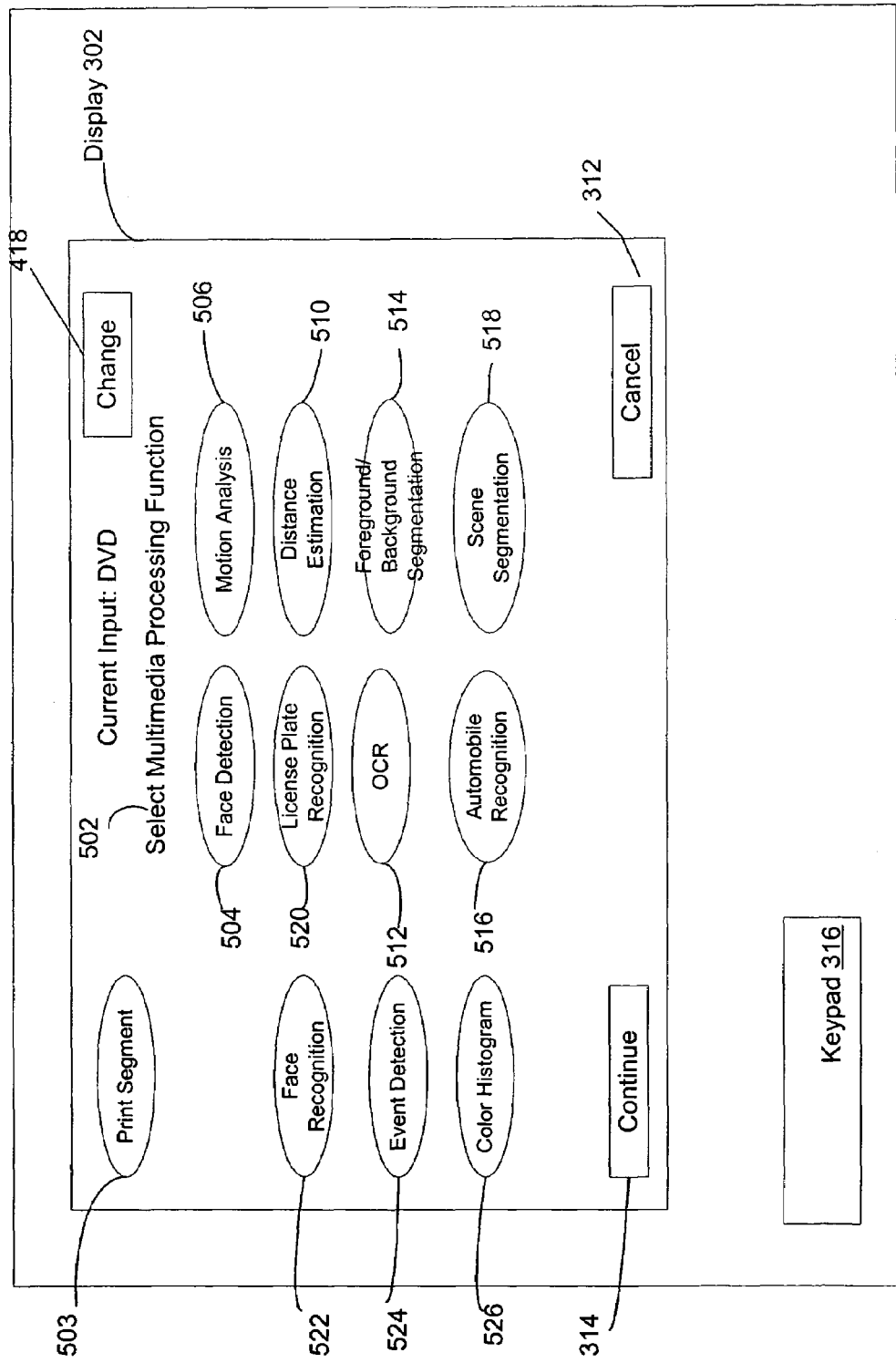
FIG. 5 illustrates a user interface display for selecting a video multimedia processing function in accordance with an embodiment of the present invention.

In a preferred embodiment, printer 100 is capable of performing many multimedia processing functions on a video selection. Available functions preferably include event detection, color histogram analysis, face detection, face recognition, optical character recognition (OCR), motion analysis, distance estimation, foreground/background segmentation, scene segmentation, automobile recognition and license plate recognition. As can be seen in FIG. 5, user interface 110 provides a user with the ability to select from among these options. In FIG. 5, display 302 of UI 110 includes a user instruction 502, instructing the user to select the desired multimedia processing function. Display 302 also includes the available options, which in the illustrated case are selectable via buttons for Print Segment 503, Event Detection 524, Color Histogram Analysis 526, Face Detection 504, Face Recognition 522, Optical Character Recognition (OCR) 512, Motion Analysis 506, Distance Estimation 510, Foreground/Background Segmentation 514, Scene Segmentation 518, Automobile Recognition 516 and license plate recognition 520. A button 418 is also provided in one embodiment to allow the current input to be changed, as described above with respect to FIG. 3. Finally, a cancel button 312 is available that returns the user to a previous screen, and a continue button 314 is available to be selected when the user has specified all of the desired processing functions.

Selecting one of the multimedia processing functions displays a submenu for the user specific to that processing function.

In one embodiment, if a user selects the Print Segment button 403, dialog box 302 shows key frames along a timeline and has slider controls that let the user select portions of a given video file to print. The manner in which output is created by the printer is discussed below.

Selecting the Event Detection button 524 displays a dialog showing the results of applying a video event detection algorithm along a timeline. Examples of video events include cases when people stand up during a meeting or when they enter a room. A slider control is preferably provided to let the user select portions of a given video file to print, based on a confidence value.

Selecting the Color Histogram button 526 presents a dialog showing the results of applying a color histogram analysis algorithm along a timeline. For example, a hue diagram is shown at every 30-second interval. This allows a user to quickly locate the portions of a video that contain sunsets, for example. A slider control is preferably provided that lets the user select portions of a given video file to print, based on the histogram computation.

Selecting the Face Detection button 504 displays a dialog showing segments along a timeline that contain face images. Each segment is preferably accompanied by an integer that expresses the number of faces detected in the clip as well as a confidence value. Slider controls are preferably provided that let the user select portions of a given video file to print, based the confidence values. In another embodiment, the face images are clustered so that multiple instances of the same face are merged into one representation face image.

Selecting the Face Recognition button 522 presents a dialog showing names along a timeline that were derived by application of face recognition to video frames at corresponding points along the time line. Slider controls are preferably provided that let the user select portions of a given video file to print. Also, a series of checkboxes are provided that let the user select clips by choosing names.

Selecting the OCR button 512 causes each frame in the video to be OCR'd and subsampled, for example once every 30 frames, and the results displayed along a timeline. Slider controls are preferably provided to let the user select portions of a given video file to print based on the confidence values that accompany the OCR results. A text entry dialog is also preferably provided to let the user enter words that are searched within the OCR results. Clips that contain the entered text are indicated along the timeline. In one embodiment, results of the OCR function are clustered so that similar OCR results are merged.

Selecting the Motion Analysis button 506 displays a dialog showing the results of applying a motion analysis algorithm along a timeline. One type of motion analysis that can be used is a waveform having a magnitude that indicates the amount of detected motion. This allows a user to quickly locate the portions of a video that contain a person running across the camera's view, for example. A slider control preferably lets the user select portions of a given video file to print, based on the amount of motion that was detected.

Selecting the Distance Estimation button 510 presents a dialog showing the results of applying a distance estimation algorithm along a timeline. For example, in a surveillance camera application using two cameras separated by a known distance, the distance of each point from the camera can be estimated. A slider control preferably lets the user select portions of a given video file to print, based on their distance from the camera. For example, the user may wish to see only objects that are more than 50 yards away from the camera.

In one embodiment, the motion analysis algorithm and distance estimation algorithm are applied together.

Selecting the Foreground/Background Segmentation button 514 displays a dialog showing the results of applying a foreground/background segmentation algorithm along a timeline. At each point, the foreground objects are displayed. A clustering and merging algorithm can be applied across groups of adjacent frames to reduce the number of individual objects that are displayed. Slider controls are preferably provided to let the user select portions of a given video file to print based on the confidence value of the foreground/background segmentation as well as the merging algorithm.

Selecting the Scene Segmentation button 518 presents a dialog showing the results of applying a shot segmentation algorithm along a timeline. Each segment can be accompanied by a confidence value that the segmentation is correct. A slider control is preferably provided to let the user select portions of a given video file to print, based on the confidence value.

Selecting the Visual Inspection button 528 presents a dialog showing an image from an attached video camera. The user can outline areas of the scene and define parameters for the objects that could appear in those areas. For example, for circular objects, a slider control preferably lets a user choose the diameter and allowable variations. This can be applied to automatic inspection of objects on an assembly line such as ball bearings that should be perfectly circular with a diameter of 2.54 centimeters. The user can also choose actions that are executed when the selected parameters are exceeded. For example, a frame image should be grabbed and printed if a ball bearing is detected with a diameter different from the defined value by more than 0.01 centimeters. Also, an email can be sent to a specified user.

In one embodiment, scene segmentation can be combined with face recognition. In such an embodiment, each segment can be accompanied by a confidence value that the segmentation is correct. The results of face recognition are shown as names along the timeline. Slider controls are preferably provided to let the user select portions of a given video file to print, based the confidence values of shot segmentation and face recognition. Additionally, a series of checkboxes are provided to let the user select clips by choosing names.

In another embodiment, scene segmentation can be combined with face detection such that color or a special icon indicates segments on the timeline that contain face images. Each segment can be accompanied by an integer that expresses the number of faces detected as well as a confidence value. Slider controls are preferably provided to let the user select portions of a given video file to print, based on the confidence values of shot segmentation and face detection.

In another embodiment, scene segmentation and OCR can be combined. In such an embodiment, a dialog shows the results of applying a shot segmentation algorithm along a timeline. Each segment can be accompanied by a confidence value that the segmentation is correct. Each frame in the video is OCR'd and subsampled, for example once every 30 frames, and the results are displayed along the timeline. A text entry dialog is also provided that lets the user enter words to be searched within the OCR results. Clips that contain the entered text are indicated along the timeline. Slider controls are preferably provided to let the user select portions of a given video file to print based on the confidence values that accompany the shot segmentation and OCR results. In another embodiment, names are also shown on the timeline that were derived by application of face recognition to video frames. Additionally, a series of checkboxes are provided that let the user select clips by choosing names. Slider controls are provided that let the user select portions of a given video file to print based on the confidence values that accompany the shot segmentation, OCR, and face recognition results.

In another embodiment, scene segmentation, OCR and face detection are combined. In that embodiment, segments on the timeline that contain face images are shown. Each segment can be accompanied by an integer that expresses the number of faces detected in the clip as well as a confidence value. Slider controls are preferably provided to let the user select portions of a given video file to print based on the confidence values that accompany the shot segmentation, OCR, and face detection results.

Selecting the Automobile Recognition button 516 displays a dialog for configuring and using the automobile recognition function. In one embodiment, a user operates a surveillance camera that creates many hours of video, most of which is not of interest to the user. The user needs to find and print only those sections that contain a specific object, for example a red Cadillac. For this purpose, each frame in the video is input to an automobile recognition technique and the results are displayed along a timeline. Slider controls are preferably provided that let the user select portions of a given video file to print based on the confidence values that accompany the automobile recognition results. A text entry dialog is also preferably provided that lets the user enter identifiers for the make, model, color, and year for an automobile that are searched within the automobile recognition results. Clips that contain the entered information are indicated along the timeline.

In another embodiment, a user often needs to find and print only those sections that contain a specific license plate number. For this purpose, a user can select the License Plate Recognition button 520. Each frame in the video is input to a license plate recognition technique and the results, typically a plate number, state, plate color, name and address of plate holder, outstanding arrest warrants, criminal history of the plate holder, etc., are displayed along a timeline. Slider controls are preferably provided to let the user select portions of a given video file to print based on the confidence values that accompany the license plate recognition results. A text entry dialog is also provided that lets the user enter identifiers for the plate number, state, and year, etc. for a license plate that are searched within the license plate recognition results. Clips that contain the entered information are indicated along the timeline.

In another embodiment, a user needs to find and print only those sections that contain a specific object, such as a speeding red Cadillac. The automobile recognition function can be combined with motion analysis for this purpose. Each frame in the video is preferably input to an automobile recognition technique and the results are displayed along a timeline. Additionally, a motion analysis technique is applied to the video to estimate the automobile's speed from one frame to the next. Slider controls are preferably provided that let the user select portions of a given video file to print based on the confidence values that accompany the automobile recognition and motion analysis results. A text entry dialog is also provided that lets the user enter identifiers for the make, model, color, and year for an automobile and its speed that are searched within the automobile recognition and motion analysis results. Clips that contain the entered information are indicated along the timeline.

Figure 6:
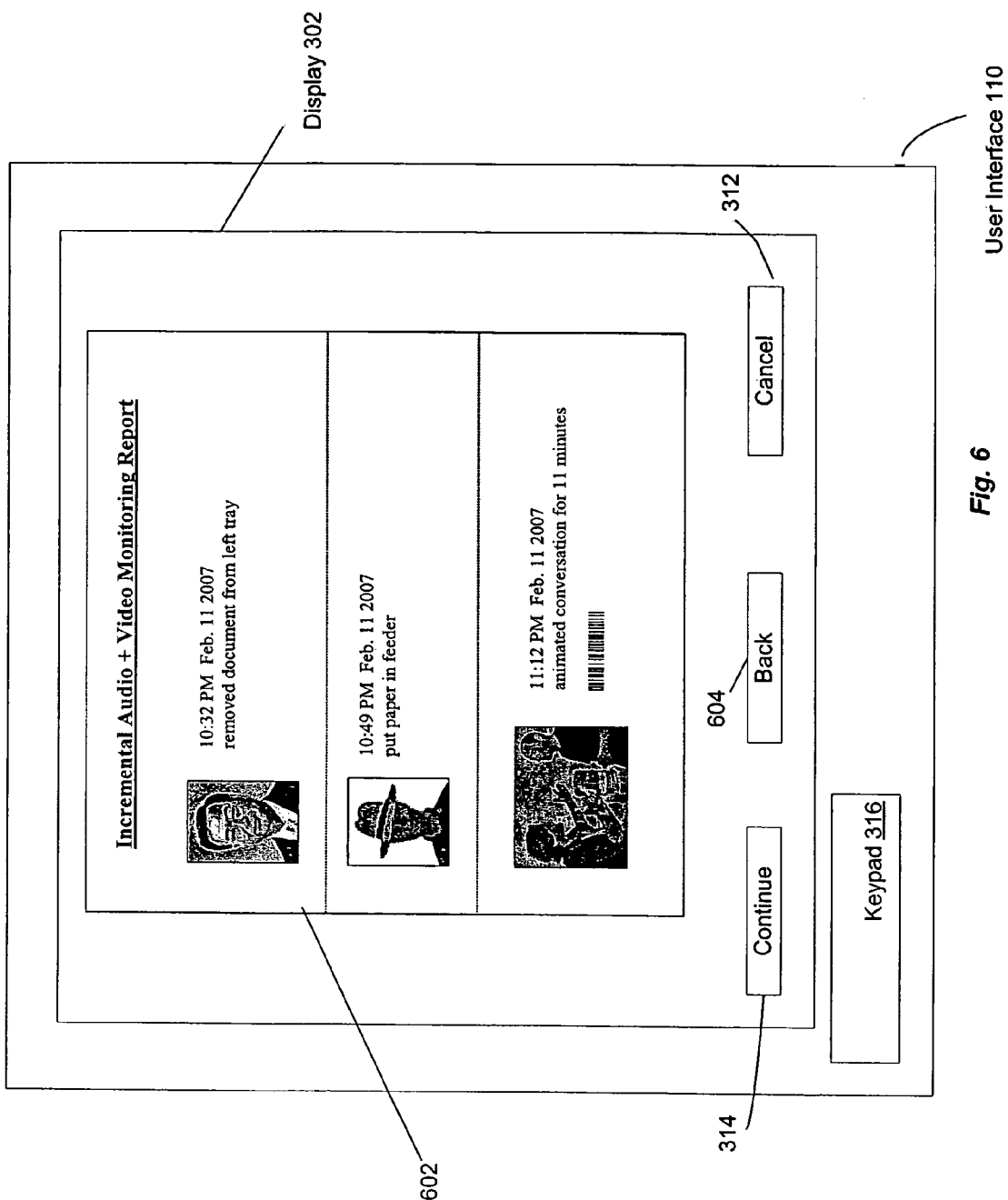
FIG. 6 illustrates a user interface display for previewing output in accordance with an embodiment of the present invention.

After the user has selected one or more multimedia processing functions to apply, printer 100 performs the selected functions and produces a preview of the result. FIG. 6 illustrates an example of a previewed result. In FIG. 6, display 302 shows a preview 602 of the output that will be printed, as well as a Continue button 314, a Cancel button 312 and a Back button 604. If the user does not like the previewed output 602, he can select the Back button 604, which in a preferred embodiment returns the user to the previous screen. Alternatively, the user can press the Cancel button 312 to cancel the print operation completely. If the user wants to continue with the print job, he selects the Continue button 314 to go on. As those of skill in the art will recognize, the particular preview 602 depends on the features that were applied. In the illustrated example of FIG. 6, sound localization and motion detection have been employed to create the displayed page.

Once the user is satisfied with the previewed output 602 and selects the Continue button, the next task in a preferred embodiment is to select the output path. In a preferred embodiment, output can be directed along a printed output path 160, an electronic output path 170, or both.

Figure 7:
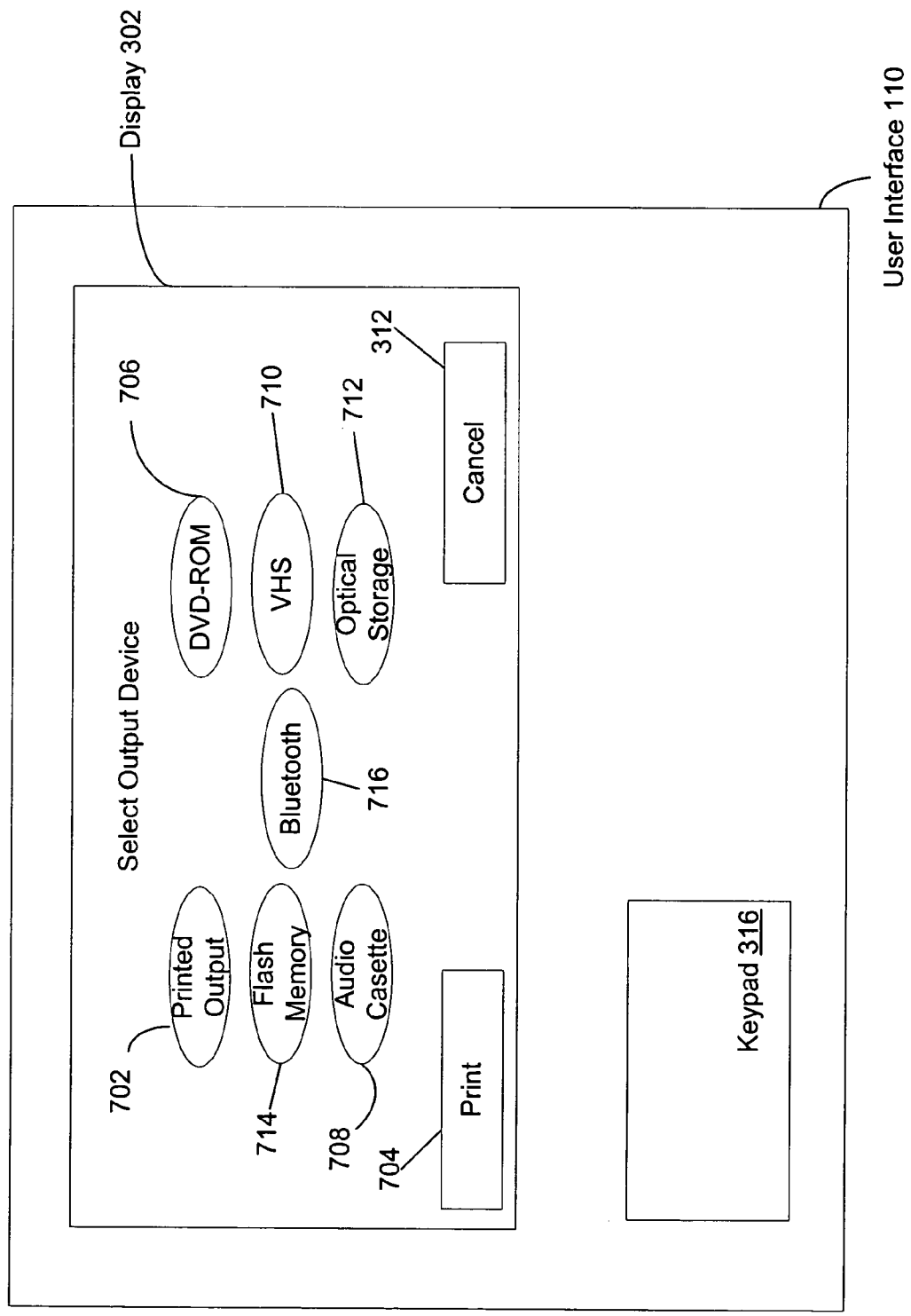
FIG. 7 illustrates a user interface display for selecting output devices for printing in accordance with an embodiment of the present invention.

Referring now to FIG. 7, there is shown an example of a display 302 of a user interface 110 with which a user can select an output path. By selecting the Printed Output button 702, data will be routed to the printed output system 115 and be printed in a conventional manner by printer 100. If the user selects one of the buttons associated with the electronic output system 120, data will be routed to the particular output device selected. In the illustrated case of FIG. 7, the user can select a DVD-ROM drive 706, an Audio Cassette 708, VHR 710 Optical Storage 712, Flash Memory 714, or Bluetooth device 716. Once the user has made his selection, he presses the Print button 704 to send the output to the selected locations, or Cancel 312 to quit.

Distributed Processing

Figure 8:
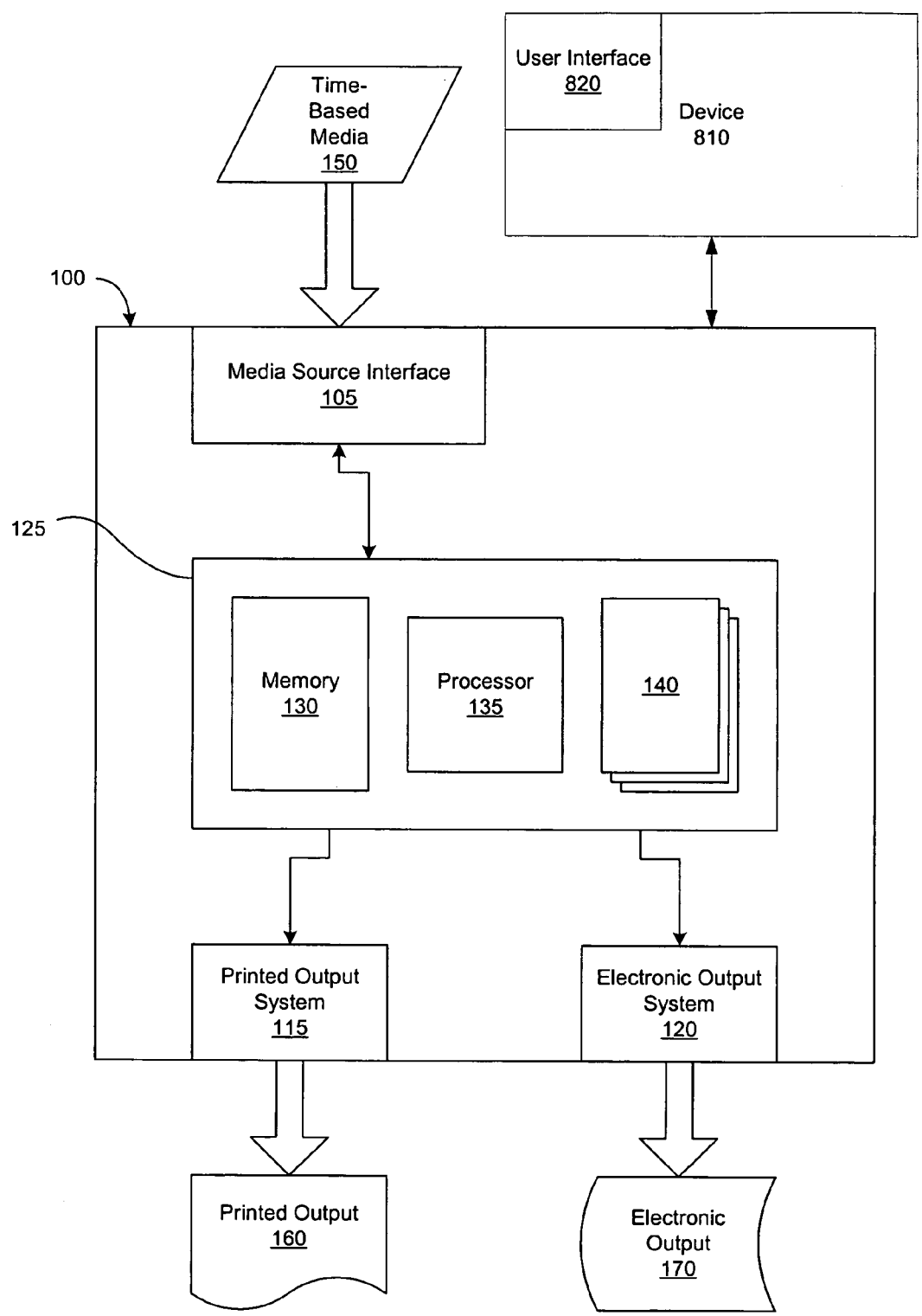
FIG. 8 is a block diagram illustrating a printer and a device having an associated user interface in accordance with an embodiment of the present invention.
Figure 9:
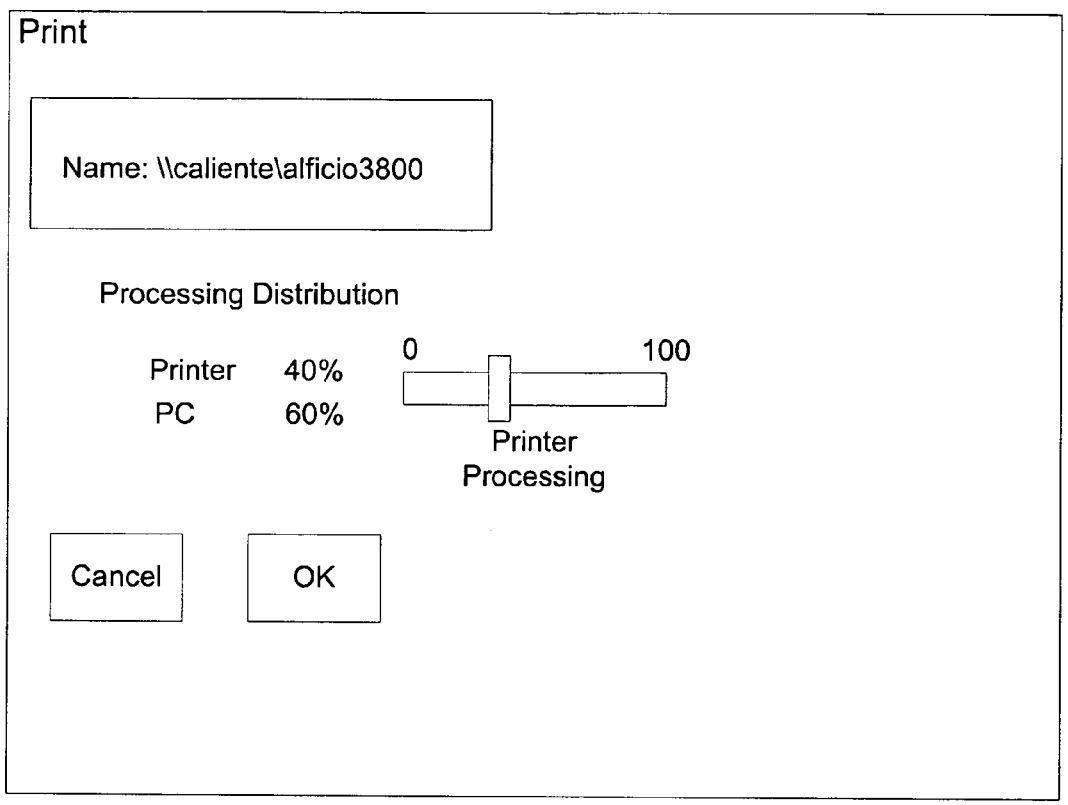
FIG. 9 is an illustration of a user interface screen for distributing processing between devices in accordance with an embodiment of the present invention.

In one embodiment, and referring now to FIG. 8, multimedia processing functions applied to the time based media are distributed between printer 100 and device 810. Distributing processing functions among multiple devices improves efficiency and allows, for example, device 810 to perform processing functions for which it has a specialized architecture, while printer 100 performs functions requiring less processing power. Time-based media 150 may be stored in or generated by device 810, or may be entirely separate from device 810, but in communication with it. In yet another embodiment, device 810 is not directly in communication with time-based media 150, but communicates with it via printer 100. FIG. 9 illustrates an example of a user interface for adjusting the distribution of processing power between devices. In FIG. 9, the printer is configured to perform 40% of the required processing, while a PC is configured to perform 60% of the processing.

In one embodiment, device 810 is a computer such as a desktop PC. Device 810 preferably includes an interface 820, which performs functionality similar to that described above with reference to printer user interface 110. An example of a user interface is illustrated in FIG. 10, which shows a screen for printing user-selected ranges in an audio file.

The present invention has been described in particular detail with respect to a limited number of embodiments. Those of skill in the art will appreciate that the invention may additionally be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component. For example, the particular functions of the user interface 110 and so forth may be provided in many or one module.

Some portions of the above description present the feature of the present invention in terms of algorithms and symbolic representations of operations on information. These algorithmic descriptions and representations are the means used by those skilled in the user interface and printing arts to most effectively convey the substance of their work to others skilled in the art. These operations, while described functionally or logically, are understood to be implemented by computer programs. Furthermore, it has also proven convenient at times, to refer to these arrangements of operations as modules or code devices, without loss of generality.

It should be borne in mind, however, that all of these and similar terms are to be associated with the appropriate physical quantities and are merely convenient labels applied to these quantities. Unless specifically stated otherwise as apparent from the present discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description above. In addition, the present invention is not described with reference to any particular programming language. It is appreciated that a variety of programming languages may be used to implement the teachings of the present invention as described herein, and any references to specific languages are provided for disclosure of enablement and best mode of the present invention.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention.

We claim:

1. A system for printing time-based media data, the system comprising:

a user interface for receiving user input, the user input specifying a multimedia function to perform on the time-based media and specifying a distribution of processing power for carrying out the specified multimedia function, wherein carrying out the specified multimedia function includes selecting a range of the time-based media;

a printer, communicatively coupled to the user interface, the printer adapted to perform a first amount of processing satisfying the distribution of processing power indicated by the received user input, and to output an instruction to perform a second amount of processing satisfying the distribution of processing power indicated by the received user input; and a processing device adapted to receive the instruction from the printer and perform the second amount of processing in response to the instruction from the printer.

2. The system of claim 1 wherein the processing device includes the user interface.

3. The system of claim 1 wherein the printer includes the user interface.

4. The system of claim 1 wherein the user interface is on a device separate from the processing device and the printer.

5. The system of claim 2, 3 or 4 wherein the user interface displays status information about the performance of the multimedia function.

6. The system of claim 1 wherein the processing device is a personal computer.

7. The system of claim 1 wherein the multimedia function includes selecting a range of audio data in response to received input from the user.

8. The system of claim 1 wherein the multimedia function includes applying audio event detection to the time-based media data.

9. The system of claim 8 wherein the multimedia function further includes determining a confidence level associated with the audio event detection.

10. The system of claim 1 wherein the multimedia function includes applying a speaker segmentation function to the time-based media data.

11. The system of claim 1 or 10 wherein the multimedia function includes applying a speaker recognition function to the time-based media data.

12. The system of claim 1 wherein the multimedia function includes applying a sound source localization function to the time-based media data.

13. The system of claim 12 wherein the multimedia function further includes applying audio event detection to the time-based media data.

14. The system of claim 1 wherein the multimedia function includes applying a speech recognition function to the time-based media data.

15. The system of claim 14 wherein the multimedia function includes applying a profile analysis function to the time-based media data.

16. The system of claim 14 wherein the multimedia function includes applying an audio event detection function to the time-based media data.

17. The system of claim 16 wherein the multimedia function further includes applying a speaker recognition function to the time-based media data.

18. The system of claim 16 wherein the multimedia function further includes applying a speaker segmentation function to the time-based media data.

19. The system of claim 16 wherein the multimedia function further includes applying a sound localization function to the time-based media data.

20. The system of claim 1 wherein the multimedia function includes selecting a range of video data in response to received input from the user.

21. The system of claim 1 wherein the multimedia function includes applying a video event detection function to the time-based media data.

22. The system of claim 1 wherein the multimedia function includes applying a color histogram analysis function to the time-based media data.

23. The system of claim 1 wherein the multimedia function includes applying a face detection function to the time-based media data.

24. The system of claim 23 wherein the multimedia function includes applying a clustering function to the time-based media data to merge multiple instances of a face into a representative face image.

25. The system of claim 1 wherein the multimedia function includes applying a face recognition function to the time-based media data.

26. The system of claim 1 wherein the multimedia function includes applying an optical character recognition function to the time-based media data.

27. The system of claim 26 wherein the multimedia function further includes applying a clustering function to the time-based media data to merge similar results of the optical character recognition.

28. The system of claim 1 wherein the multimedia function includes applying a motion analysis function to the time-based media data.

29. The system of claim 1 or claim 28 wherein the multimedia function includes applying a distance estimation function to the time-based media data.

30. The system of claim 1 wherein the multimedia function includes applying foreground/background segmentation function to the time-based media data.

31. The system of claim 1 wherein the multimedia function includes applying a scene segmentation function to the time-based media data.

32. The system of claim 31 wherein the multimedia function further includes applying a face recognition function to the time-based media data.

33. The system of claim 31 wherein the multimedia function further includes applying a face detection function to the time-based media data.

34. The system of claim 31 wherein the multimedia function includes applying an optical character recognition function to the time-based media data.

35. The system of claim 34 wherein the multimedia function further includes applying a face recognition function to the time-based media data.

36. The system of claim 34 wherein the multimedia function includes applying a face detection function to the time-based media data.

37. The system of claim 1 wherein the multimedia function includes applying an automobile recognition function to the time-based media data.

38. The system of claim 37 wherein the multimedia function further includes applying a motion analysis function to the time-based media data.

39. The system of claim 1 wherein the multimedia function includes applying a license plate recognition function to the time-based media data.

40. The system of claim 1 wherein the multimedia function includes applying a visual inspection function to the time-based media data.

41. The system of claim 1 wherein the user interface is configured to allow a user to control a compact disc (CD) device.

42. The system of claim 1 wherein the user interface is configured to allow a user to control a digital video disc (DVD) device.

43. The system of claim 1 wherein the user interface is configured to allow a user to control an audio tape device.

44. The system of claim 1 wherein the user interface is configured to allow a user to control a video tape device.

45. The system of claim 1 wherein the user interface is configured to allow a user to control a multimedia server.

46. The system of claim 1 wherein the user interface is configured to allow a user to control encryption hardware.

47. The system of claim 1 wherein the user interface is configured to allow a user to control audio sound localization hardware.

48. The system of claim 1 wherein the user interface is configured to allow a user to control motion detection hardware.

49. The system of claim 1 wherein the user interface is configured to allow a user to control a MIDI player.

50. The system of claim 1 wherein the user interface is configured to allow a user to control a cellular telephone.

51. The system of claim 1 wherein the user interface is configured to allow a user to control a two-way radio.

52. The system of claim 1 wherein the user interface is configured to allow a user to control a world wide web display.

53. The system of claim 1 wherein the user interface is configured to allow a user to control a climate sensor.

54. The system of claim 1 wherein the user interface is configured to allow a user to control a radio receiver.

55. The system of claim 1 wherein the processor is further configured to display results of the multimedia function on the display of the user interface.

56. The system of claim 1 wherein the processing device is a DVD drive.

57. The system of claim 1 wherein the processing device is a CD drive.

58. The system of claim 1 wherein the processing device is an audio tape drive.

59. The system of claim 1 wherein the processing device is a video cassette device.

60. The system of claim 1 wherein the processing device is a removable media device.

61. The system of claim 1 wherein the processing device is an embedded audio recorder.

62. The system of claim 1 wherein the processing device is an embedded video recorder.

63. The system of claim 1 wherein the processing device is an non-volatile storage device.

64. The system of claim 1 wherein the processing device is an embedded multimedia server.

65. The system of claim 1 wherein the processing device is audio encryption hardware.

66. The system of claim 1 wherein the processing device is video encryption hardware.

67. The system of claim 1 wherein the processing device is audio sound localization hardware.

68. The system of claim 1 wherein the processing device is a cellular telephone.

69. The system of claim 1 wherein the processing device is a two-way radio.

70. The system of claim 1 wherein the processing device is a world-wide web display.

71. The system of claim 1 wherein the processing device is a radio receiver for receiving AM signals.

72. The system of claim 1 wherein the processing device is a radio receiver for receiving FM signals.

73. The system of claim 1 wherein the processing device is a radio receiver for receiving short wave signals.

74. The system of claim 1 wherein the processing device is a satellite radio receiver.

75. The system of claim 1 wherein the processing device is a weather alert receiver.

76. The system of claim 1 wherein the processing device is an emergency alert monitor for receiving emergency broadcast system alerts.

77. The system of claim 1 wherein the processing device is hardware for performing VGA screen captures.

78. The system of claim 1 wherein the processing device is hardware for performing audio capture.

79. The system of claim 1 wherein the processing device is hardware for capturing data from an electronic pen.

80. The system of claim 1 wherein the processing device is a disposable media writer.

81. A method for printing time-based media, the method comprising:
receiving time-based media data from a media source;
receiving user input, the user input specifying a multimedia function to perform on the time-based media and specifying a distribution of processing power between a printer and a processing device to carry out the specified multimedia function, wherein carrying out the specified multimedia function includes selecting a range of the time-based media;
determining a first portion of the processing to be allocated to the printer and a second portion of the processing to be allocated to the processing device satisfying the distribution of processing power specified by the user input;
allocating the determined processing portions to the printer and the processing device based on the distribution of processing power specified by the user input;
performing, by the printer, the allocated first portion of processing to carry out the specified multimedia function;
performing, by the processing device, the allocated second portion of processing to carry out the specified multimedia function;
producing a printed output comprising a first representation the processed time-based media data; and
producing an electronic output comprising a second representation of the processed time-based media data.

82. The method of claim 81 wherein the user input is received at the printer.

83. The method of claim 81 wherein the user input is received at the processing device.

84. The method of claim 81 wherein the processing device is a personal computer.

85. The method of claim 81 wherein the multimedia function includes selecting a range of audio data in response to received input from the user.

86. The method of claim 81 wherein the multimedia function includes applying audio event detection to the time-based media data.

87. The method of claim 86 wherein the multimedia function further includes determining a confidence level associated with the audio event detection.

88. The method of claim 81 wherein the multimedia function includes applying a speaker segmentation function to the time-based media data.

89. The method of claim 81 or 88 wherein the multimedia function includes applying a speaker recognition function to the time-based media data.

90. The method of claim 81 wherein the multimedia function includes applying a sound source localization function to the time-based media data.

91. The method of claim 90 wherein the multimedia function further includes applying audio event detection to the time-based media data.

92. The method of claim 81 wherein the multimedia function includes applying a speech recognition function to the time-based media data.

93. The method of claim 92 wherein the multimedia function includes applying a profile analysis function to the time-based media data.

94. The method of claim 92 wherein the multimedia function includes applying an audio event detection function to the time-based media data.

95. The method of claim 94 wherein the multimedia function further includes applying a speaker recognition function to the time-based media data.

96. The method of claim 94 wherein the multimedia function further includes applying a speaker segmentation function to the time-based media data.

97. The method of claim 94 wherein the multimedia function further includes applying a sound localization function to the time-based media data.

98. The method of claim 81 wherein the multimedia function includes selecting a range of video data in response to received input from the user.

99. The method of claim 81 wherein the multimedia function includes applying a video event detection function to the time-based media data.

100. The method of claim 81 wherein the multimedia function includes applying a color histogram analysis function to the time-based media data.

101. The method of claim 81 wherein the multimedia function includes applying a face detection function to the time-based media data.

102. The method of claim 101 wherein the multimedia function includes applying a clustering function to the time-based media data to merge multiple instances of a face into a representative face image.

103. The method of claim 81 wherein the multimedia function includes applying a face recognition function to the time-based media data.

104. The method of claim 81 wherein the multimedia function includes applying an optical character recognition function to the time-based media data.

105. The method of claim 104 wherein the multimedia function further includes applying a clustering function to the time-based media data to merge similar results of the optical character recognition.

106. The method of claim 81 wherein the multimedia function includes applying a motion analysis function to the time-based media data.

107. The method of claim 81 or claim 106 wherein the multimedia function includes applying a distance estimation function to the time-based media data.

108. The method of claim 81 wherein the multimedia function includes applying foreground/background segmentation function to the time-based media data.

109. The method of claim 81 wherein the multimedia function includes applying a scene segmentation function to the time-based media data.

110. The method of claim 109 wherein the multimedia function further includes applying a face recognition function to the time-based media data.

111. The method of claim 109 wherein the multimedia function further includes applying a face detection function to the time-based media data.

112. The method of claim 109 wherein the multimedia function includes applying an optical character recognition function to the time-based media data.

113. The method of claim 112 wherein the multimedia function further includes applying a face recognition function to the time-based media data.

114. The method of claim 112 wherein the multimedia function includes applying a face detection function to the time-based media data.

115. The method of claim 81 wherein the multimedia function includes applying an automobile recognition function to the time-based media data.

116. The method of claim 115 wherein the multimedia function further includes applying a motion analysis function to the time-based media data.

117. The method of claim 81 wherein the multimedia function includes applying a license plate recognition function to the time-based media data.

118. The method of claim 81 wherein the multimedia function includes applying a visual inspection function to the time-based media data.

* * * * *